United States Patent [19]
Usui et al.

[11] 3,741,583
[45] June 26, 1973

[54] MOTOR VEHICLE SAFETY DEVICE

[75] Inventors: Keizaburo Usui; Takashi Haruna, both of Yokosuka; Yoshinori Akiyama, Yokohama, all of Japan

[73] Assignee: Nissan Motor Company, Limited, Yokohama City, Japan

[22] Filed: June 15, 1971

[21] Appl. No.: 153,180

[30] Foreign Application Priority Data
June 25, 1970 Japan.............................. 45/63362
Nov. 7, 1970 Japan.............................. 45/98036

[52] U.S. Cl.............. 280/150 AB, 49/141, 85/1 R, 85/DIG. 1, 296/84 K
[51] Int. Cl............................................. B60r 21/08
[58] Field of Search................ 280/150 AB; 49/31, 49/141; 89/1 B; 292/DIG. 65; 296/93; 85/DIG. 1, 1 R

[56] References Cited
UNITED STATES PATENTS

| | | | |
|---|---|---|---|
| 2,297,892 | 10/1942 | Jacobs | 137/535 X |
| 3,119,298 | 1/1964 | Brown | 89/1 B X |
| 3,456,387 | 7/1969 | Tolson | 49/31 |
| 3,486,410 | 12/1969 | Drexelius et al. | 89/1 B |
| 3,624,810 | 11/1971 | Hass | 280/87 R X |

Primary Examiner—Leo Friaglia
Assistant Examiner—David M. Mitchell
Attorney—Robert E. Burns et al.

[57] ABSTRACT

Herein disclosed is a safety device for protecting a vehicle occupant from injury during a collision of a motor vehicle. The safety device uses an inflatable protector bag which is normally stowed in a contracted condition and which is expanded and projected to a protective condition intervening between the vehicle occupant and surrounding structural parts of the vehicle cabin when an impact resulting from the collision is detected. The safety device also uses a blasting means which is adapted to destroy or release a window pane of any of the front windshield, side door windows and a rear window immediately when the inflatable protector bag is expanded. The blasting means thus protects the vehicle occupant from hurting his eardrums and/or intestines due to a sudden rise in the atmospheric pressure in the vehicle cabin. The blasting means will also facilitate the vehicle occupant to get out of the vehicle cabin through the broken windows in the event of the collision.

8 Claims, 12 Drawing Figures

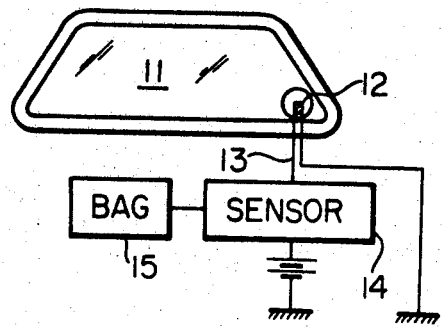
Fig. 1
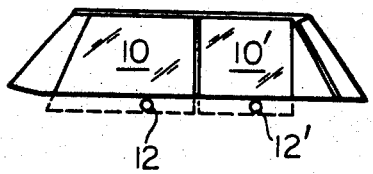
Fig. 2
Fig. 3
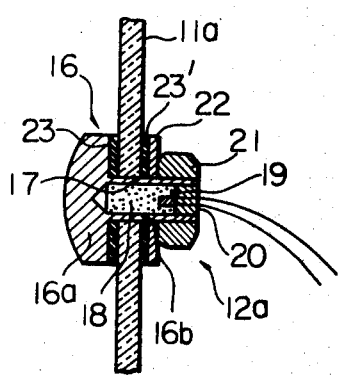
Fig. 4a
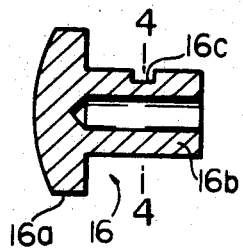
Fig. 4b
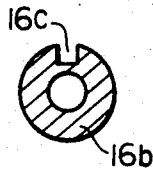

PATENTED JUN26 1973

MOTOR VEHICLE SAFETY DEVICE

This invention relates to a safety device for a motor vehicle and, more particularly, to a vehicle safety device of the type which is adapted to guard a vehicle occupant from injury during a collision of a motor vehicle.

The safety device to which this invention is directed uses an inflatable protector bag which is normally stowed in a folded or contracted condition and which is expanded to a protective condition intervening between the vehicle occupant and structural parts of the vehicle cabin when actuated. This inflatable protector bag is operatively connected to a source of a pressurized gas. The pressurized gas is admitted to the inflatable protector bag until the protector bag is fully expanded to the protective condition immediately when an impact resulting from a collision of the motor vehicle is detected by appropriate sensing means which forms part of the safety device. A force of inertia in the vehicle occupant who is violently flung to the expanded protector bag is thus absorbed in a significant proportion so that the vehicle occupant is prevented from striking against the structural parts of the vehicle cabin.

As a result of the rapid expansion of the protector bag in the vehicle cabin which is usually closed by window panes of the front windshield, side door windows and rear window, the pressure in the window cabin increases suddenly so that the occupant's eardrums and-/or intenstines are liable to be seriously hurt or even destroyed.

An object of this invention is, therefore, to provide a vehicle safety device of the described type in which means is provided to break or release a window pane of any of the windshield, side door window and rear window immediately when an inflatable protector bag of the safety device is suddenly expanded, whereby the vehicle occupant is prevented not only from striking against the structural parts of the vehicle cabin but from having his eardrums and intestines hurt or failed in the event of the collision of the motor vehicle.

The safety device according to this invention is also useful in that the vehicle occupant involved in the collision of the motor vehicle is ready to escape from the vehicle cabin through the broken window even though the vehicle body is deformed and consequently the doors are prevented from being opened in the usual manner.

Thus, another object of this invention is to provide a vehicle safety device by which the vehicle occupant can readily withdraw from the vehicle in the event the motor vehicle encounters a collision and consequently the doors are locked by deformation.

These objects of this invention are achieved generally by means of a safety device which comprises an inflatable protector bag which is normally stowed in a contracted condition and which is expanded to a protective condition during a collision of a motor vehicle, normally inoperative pressurized gas supply means associated with the protector bag for expanding the bag with a pressurized gas when made operative, sensing means responsive to a collision condition and connected to the pressurized gas supply means, and blasting means mounted on a window pane of the motor vehicle and including explosive means which is connected to the sensing means. The explosive means is actuated or fired when the sensing means responds to the collision condition so as to blast the window pane for preventing the pressure in the vehicle cabin from increasing with the rapid expansion of the protector bag. The blasting means may be constructed and arranged in a manner to break or release the window pane from the window or windshield depending upon the nature of the material glass of the window pane. Where the window pane is made of tempered glass which is readily broken into pieces when blasted, the blasting means may be of the type which is adapted to break the window pane into minute pieces. Where, on the contrary, the window pane is made of glass which is rather resistant to a mechanical impact or shocks, then the blasting means may be constructed to have the window pane released or separated from a support such as a door garnish of the window or windshield.

IN THE DRAWINGS:

FIG. 1 is a front end view of a windshield having applied thereto the blasting means of the safety device according to this invention;

FIG. 2 is a side end of side door windows having located thereon the blasting means;

FIG. 3 is a sectional view showing a preferred form of the blasting means to be applied to the window panes of windshield or door windows as illustrated in FIGS. 1 and 2;

FIG. 4a is a sectional view of a modified form of a receptacle forming part of the blasting means shown in FIG. 3;

FIG. 4b is a section on line 4—4 of FIG. 4a;

FIG. 10b is a front end view of the blasting means shown in FIG. 10a.

Reference is first made to FIG. 1 in which the window pane 11, shown as the pane of a windshield, has applied to its edge portion the blasting means 12 which forms part of the safety device according to this invention. This blasting means 12 is connected through lines 13 appropriate sensing means 14 which is responsive to a collision condition of the motor vehicle and which is associated with an inflatable protector bag 15 of the previously described nature. When the sensing means 14 responds to the collision condition, then the inflatable protector bag 15 which has been stowed in a contracted condition is expanded to a protective condition and at the same time the blasting means 12 is actuated to break the window pane 11. The atmospheric pressure in the vehicle cabin which would otherwise rise remarkably as a result of the rapid expansion of the protector bag 15 is thus vented to the open air.

The blasting means can be mounted on any other window pane or panes of the motor vehicle other than the window pane 11 of the windshield. FIG. 2 illustrates the window panes 10' and 10" on which blasting means 12' and 12", respectively, are mounted. The blasting means disposed in a manner shown in FIGS. 1 and 2 are adapted to have the window pane broken into pieces when the blasting means is actuated or fired.

Figure 5:
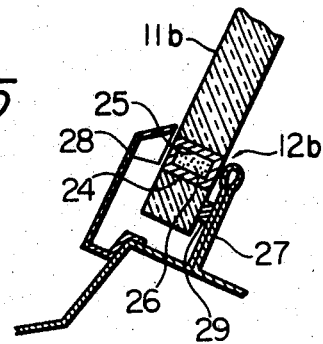
FIG. 5 is a sectional view showing another modified form of the blasting means of the safety device according to this invention.

Examples of the construction of the blasting means of this nature are illustrated in FIGS. 3 to 5.

Referring to FIG. 3, the blasting means which is now denoted by reference numeral 12a is shown to include a receptable 16 having a flange portion 16a and a bored cylindrical portion 16b which is open at one end and closed at the other by means of the flange portion 16a. This receptacle 16 is fixed to the window pane, which is now denoted by reference numeral 11a, through an aperture 17 formed in this window pane. The receptacle 16 thus has its bored cylindrical portion 16b protruding from one side of the window pane 11a and its flange portion 16a held in contact with the opposite side of the window pane. A suitable explosive means which may be a combination of an explosive charge 18 and an igniter or squib 19 contiguous with the explosive charge is accommodated in the bore in the cylindrical portion 16b of the receptacle 16. This bore in the cylindrical portion 16b is closed by an end plug 20 and the igniter or squib 19 is connected to the sensing means 14 (FIG. 1) through the lines 13. The end plug 20 serves to isolate the explosive charge and the squib from outside moisture and to prevent an explosive force from escaping to the open air. The receptacle 16 is held in place to the window pane 11a by suitable fitting means which may comprise a nut 21 and a washer 22, as illustrated. If desired, shock absorbing means 23 and 23' may be interposed between the window pane 11a and the flange 16a of the receptacle and the washer 22.

The bored cylindrical portion 16b should have a wall which is thinned enough to be readily broken when the explosive charge 18 is fired so as to effectively break the window pane. For the purpose of adding to the shearing stress in the cylindrical portion 16b, a thinned or weakened portion may be formed in this cylindrical portion 16, an example being illustrated in FIGS. 4a and 4b. As seen in these figures, the cylindrical portion 16b of the receptacle 16 is provided with a recess 16c which is formed on an outer wall of the cylindrical portion 16b and directed radially of the portion 16b.

Although the receptacle 16 is shown in FIG. 3 as secured to the window pane 11a by the aid of the nut 21 and the washer 22, the same may be adhered to the peripheral edge of the aperture 17 by an adhesive material, especially where the blasting means is mounted on the windshield. An example of the blasting means realizing this concept is illustrated in FIG. 5.

Referring to FIG. 5, the blasting means which is now denoted by reference numeral 12b, includes a closed receptacle 24 which is securely adhered to a peripheral edge of an aperture 25 formed in a window pane which is denoted by reference numeral 11b. The receptacle 24 has accommodated therein an explosive means 26 which may be a combination of an explosive charge and a squib, similarly to the receptacle 16 of FIG. 3. To prevent the explosive force from escaping to the outside, ends of the receptacle 24 may be covered by appropriate structural part 27 of the vehicle body and a molding 28 which is secured to the vehicle body. The covering of the outer end of the receptacle 25 by the molding 28 is advantageous for maintaining the external appearance of the vehicle body. Designated by reference numeral 29 is an adhesive means through which the window pane 11b is secured to the vehicle body.

Figure 6:
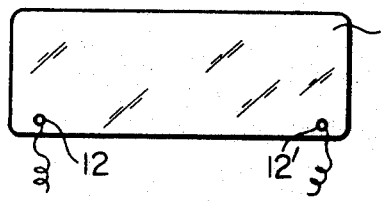
FIGS. 6 and 7 are plan views of window panes of rear windows on which the blasting means shown in any of 3 to 5 is positioned.
Figure 7:
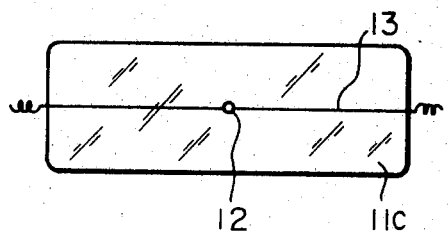

The blasting means of the safety device according to this invention may be located anywhere in any window pane or panes of the motor vehicle so as to achieve the purpose of protecting the vehicle occupant and/or pedestrian from injury by the collision of the motor vehicle. Where the blasting means is to be mounted on the window pane of the side door window, it is preferable from the aesthetical point of view that the blasting means be located behind a door garnish of the door window. If, on the other hand, the blasting means is to be mounted on a rear window pane, two of the blasting means as designated by 12 and 12' in FIG. 6 may be located substantially symmetrically in the rear window pane 11c so as not to degrade the external appearance of the vehicle. If it is desired that the blasting means 12 is mounted centrally of the rear window pane 11c as seen in FIG. 7, then the electric lines or conductors 13 connecting the blasting means 12 to the sensing means 14 (FIG. 1) may be formed on the window pane by a printed-wiring technique. If, furthermore, the blasting means is to be mounted on a two-door coupe having quarter windows, the blasting means may be attached to the quarter window in such a manner that the bolt mounting the hinge of the quarter door is hollowed or bored to accommodate therein the explosive means. Such hollowed bolt is thus utilized as the receptacle 16 or 24 which is previously illustrated.

Figure 8:
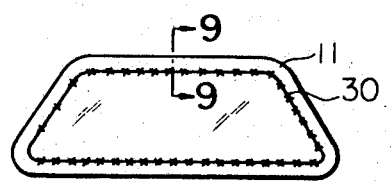
FIG. 8 is a front end view of a windshield having applied thereto a further modified form of the blasting means.
Figure 9:
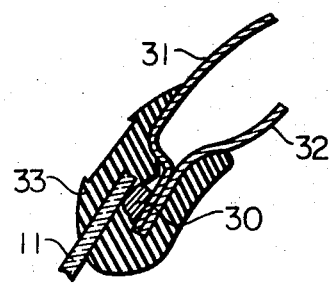
FIG. 9 is a sectional view showing the modified blasting means for use with the window pane shown in FIG. 8.
Figure 10A:
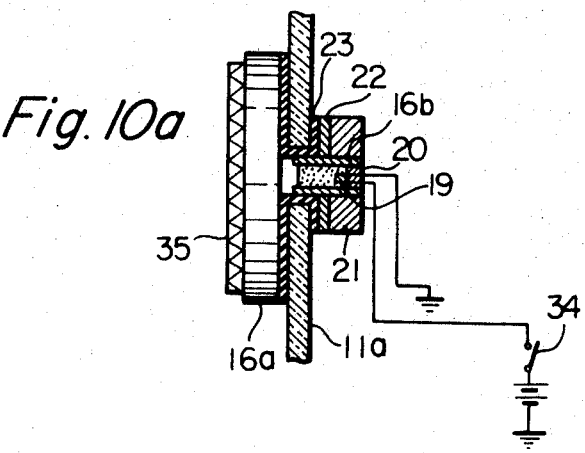
FIG. 10a is a sectional view showing a still further modified form of the blasting means of the safety device according to this invention.
Figure 10B:
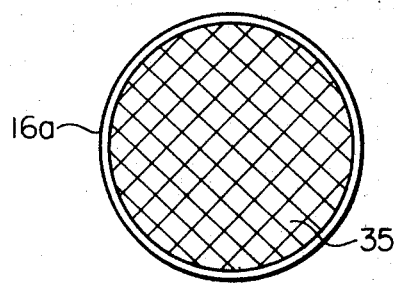

FIG. 8 now shows the blasting means which is arranged to release the window pane 11 from the window or the windshield when the collision is encountered by the motor vehicle. The blasting means of this nature has explosive means which is made up of a plurality of spaced explosive charges 30 positioned along an entire periphery of the window pane 11. A preferred arrangement of the explosive charge 30 is illustrated in FIG. 9. The explosive charge 30 is interposed between the window pane 11 and certain structural parts such as peripheral edges of a shell structure 31 and its reinforcement member 32 of the ceiling of the vehicle body and are held in position by suitable support means 33 attached to the window pane 11. This support means 33 may be a weather strip made of a resilient material such as rubber. The explosive charges 30 are connected to the previously mentioned sensing means and, when the protector bag is expanded during a collision of the motor vehicle, the explosive means is actuated or fired to cause the window pane 11 to be released in its entirety from the shell structure 31. The blasting means thus arranged is adapted for use with a window pane such as made of sandwich glass which are not likely to be broken into pieces when blasted.

Where it is desired that the blasting means of the safety device according to this invention be utilized for facilitating the vehicle occupant to get out of the vehicle cabin rather than protecting the vehicle occupant from being hurt in his eardrums and intestines, the explosive means of the blasting means may be connected to switching means which is independent of the sensing means connected to the protector bag. FIG. 10a illustrates an example of the blasting means which is constructed to achieve this purpose. As illustrated, the blasting means which per se is constructed essentially similarly to that shown in FIG. 3 has its igniter 19 connected to a source of power through a normally-open switch 34 which is adapted to be closed manually. When the motor vehicle encounters a collision and the doors are locked by deformation, the vehicle occupant should depress the switch 34 so as to actuate the blasting means whereby the window pane 11 is released from the vehicle body structure to enable the vehicle occupant to get out of the vehicle cabin.

Where the blasting means of FIG. 10a is to be mounted on the rear window pane, a reflector 35 of a decorative design may be positioned over an outer end of the blasting means so as not to impair the external appearance of the vehicle body, as shown in FIGS. 10a and 10b.

In order to have the blasting means actuated at a delayed timing, a suitable retarder may be contained in the explosive means of the blasting means.

It is to be noted that, since the pressurized gas is admitted to the protector bag after the pressurized gas source has been opened in response to the initial collision condition, the blasting means herein disclosed is actuated substantially before the protector bag starts to expand. The window pane is thus removed or broken before the protector bag is expanded to the protective position so that the vehicle occupant can be reliably protected from injury in his eardrums and intestines.

What is claimed is:

1. A vehicle safety device comprising an inflatable protector bag normally stowed in a contracted condition but quickly expandable to a protective condition during a collision of a motor vehicle, normally inoperative pressurized gas supply means associated with said protector bag to expand the protector bag with a pressurized gas when made operative, sensing means responsive to a collision condition and connected to said pressurized gas supply means to release said pressurized gas for expanding said bag, and blasting means mounted on a window pane of the motor vehicle and including explosive means which is connected to said sensing means and is fired when the sensing means responds to the collision condition for blasting said window pane at the same time that the gas is released to expand said bag.

2. A vehicle safety device as claimed in claim 1, in which said blasting means further comprises a receptacle having a flange portion and a bored portion protruding from said flange portion and closed at both ends, said bored portion accommodating therein said explosive means and being securely extended through an aperture formed in said window pane; a threaded fastener engaging said bored portion for fastening said receptacle to said window pane; and two shock absorbing members respectively interposed between said flange portion and said window pane and between said fastener and said window pane.

3. A vehicle safety device as claimed in claim 1, in which said blasting means further includes a receptacle having a bored portion closed at both ends and accommodating therein said explosive means, said bored portion having formed therein a weakened portion.

4. A vehicle safety device as claimed in claim 1, in which said blasting means further includes a receptacle having a bored portion closed at both ends and accommodating therein said explosive means, said bored portion being fitted to said window pane through an aperture formed in the window pane, said receptacle being secured to said window pane by an adhesive.

5. A vehicle safety device as claimed in claim 1, in which said blasting means further includes a receptacle having a bored portion closed at both ends and accommodating therein said explosive means, said receptacle being covered over its ends by a structural part of the vehicle body and a molding secured to the vehicle body.

6. A vehicle safety device as claimed in claim 4, in which said receptacle is located at a peripheral edge of said window pane.

7. A vehicle safety device as claimed in claim 1, in which said explosive means includes a plurality of explosive charges which are located along an entire peripheral edge of said window pane and which are spaced from each other, each of said explosive charges being interposed between the peripheral edge of said pane and the peripheral edge of a shell structure of the vehicle and its reinforced member and securely held in position by support means attached to said window pane.

8. A vehicle safety device as claimed in claim 7, in which said support means is formed by a weather strip.

* * * * *